(12) United States Patent
Taitel (10) Patent No.: US 8,046,386 B2
(45) Date of Patent: Oct. 25, 2011

(54) PARTITIONING FOR MODEL-BASED DESIGN

(75) Inventor: Howard Taitel, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1099 days.

(21) Appl. No.: 11/894,695

(22) Filed: Aug. 21, 2007

(65) Prior Publication Data

US 2008/0052667 A1    Feb. 28, 2008

Related U.S. Application Data

(63) Continuation of application No. 09/910,170, filed on Jul. 20, 2001, now Pat. No. 7,613,716.

(51) Int. Cl.
  *G06F 17/30*    (2006.01)
(52) U.S. Cl. .................. 707/803; 707/954; 717/106
(58) Field of Classification Search .............. 707/803, 707/802, 804, 805; 717/106, 108, 109; 703/2; 715/200
See application file for complete search history.

(56) References Cited

U.S. PATENT DOCUMENTS

| | | |
|---|---|---|
| 4,734,854 A | 3/1988 | Afshar |
| 4,796,179 A | 1/1989 | Lehman et al. |
| 4,914,568 A | 4/1990 | Kodosky et al. |
| 5,042,621 A | 8/1991 | Ovaska et al. |
| 5,301,336 A | 4/1994 | Kodosky et al. |
| 5,325,481 A | 6/1994 | Hunt |
| 5,331,111 A | 7/1994 | O'Connell |
| 5,479,643 A | 12/1995 | Bhaskar et al. |
| 5,485,600 A | 1/1996 | Joseph |
| 5,551,039 A | 8/1996 | Weinberg et al. |
| 5,579,462 A | 11/1996 | Barber et al. |
| 5,612,866 A | 3/1997 | Savanyo et al. |
| 5,699,310 A | 12/1997 | Garloff et al. |
| 5,734,863 A | 3/1998 | Kodosky et al. |
| 5,790,861 A | 8/1998 | Rose et al. |
| 5,815,708 A | 9/1998 | Kessler et al. |
| 5,875,333 A | 2/1999 | Fish et al. |
| 5,915,115 A | 6/1999 | Talati |
| 5,923,880 A | 7/1999 | Rose et al. |
| 5,974,257 A | 10/1999 | Austin |
| 6,085,156 A | 7/2000 | Rust et al. |
| 6,088,029 A | 7/2000 | Guiberson et al. |
| 6,173,438 B1 | 1/2001 | Kodosky et al. |
| 6,219,628 B1 | 4/2001 | Kodosky et al. |
| 6,253,369 B1 | 6/2001 | Cloud et al. |
| 6,275,981 B1 | 8/2001 | Buzbee et al. |
| 6,317,872 B1 | 11/2001 | Gee et al. |
| 6,330,546 B1 | 12/2001 | Gopinathan et al. |
| 6,408,431 B1 | 6/2002 | Heughebaert et al. |
| 6,560,557 B1 | 5/2003 | Carnahan et al. |
| 6,560,769 B1 | 5/2003 | Moore et al. |
| 6,604,110 B1 | 8/2003 | Savage et al. |
| 6,714,883 B1 | 3/2004 | Samuels |
| 6,742,175 B1 | 5/2004 | Brassard et al. |
| 6,760,908 B2 | 7/2004 | Ren |
| 6,901,579 B1 | 5/2005 | Suguta et al. |

(Continued)

*Primary Examiner* — Shahid Alam (74) *Attorney, Agent, or Firm* — Nelson Mullins Riley & Scarborough LLP (57) ABSTRACT

A method includes characterizing portions of a model as being either critical to a real-time execution of the model or non-critical to a real-time execution of the model, and generating code that is capable of real-time execution based on the critical portions of the model while maintaining the full functionality of the non-real-time critical sections, e.g., graphics, logging, other offline calculations, via a communication link and parallel host processing.

18 Claims, 4 Drawing Sheets

U.S. PATENT DOCUMENTS

| | | |
|---|---|---|
| 7,178,112 B1 | 2/2007 | Ciolfi et al. |
| 7,200,529 B2 | 4/2007 | Cifra et al. |
| 7,392,508 B1 | 6/2008 | Podowski |
| 7,650,589 B2 | 1/2010 | Cifra |
| 2003/0058280 A1 | 3/2003 | Molinari et al. |
| 2003/0195729 A1 | 10/2003 | Kodosky et al. |
| 2003/0196187 A1 | 10/2003 | Kodosky et al. |
| 2004/0254949 A1 | 12/2004 | Amirthalingam |
| 2005/0035966 A1 | 2/2005 | Pasquarette et al. |
| 2005/0035967 A1 | 2/2005 | Joffrain et al. |
| 2005/0039170 A1 | 2/2005 | Cifra et al. |
| 2007/0044078 A1 | 2/2007 | Cifra |
| 2008/0147371 A1 | 6/2008 | Gupton et al. |

PARTITIONING FOR MODEL-BASED DESIGN

CROSS-REFERENCES

This application is a continuation of U.S. patent application Ser. No. 09/910,170 filed Jul. 20, 2001, titled, "Partitioning for Model-Based Design" by the present applicant.

TECHNICAL FIELD

This invention relates to partitioning objects for model-based design.

BACKGROUND

An object model is a formal description of an object-oriented application. Semantic elements of an object model describe object classes, attributes of object classes, relationships between object classes and inheritance between object classes. One example object-oriented application is time-based block diagram modeling. Dynamic real-world systems such as electrical circuits, shock absorbers, braking systems, and many other electrical, mechanical and thermodynamic systems may be modeled, simulated and analyzed on a computer system using block diagram modeling. Block diagram modeling graphically depicts time-dependent mathematical relationships among a system's inputs, states and outputs, typically for display on a graphical user interface (GUI). Block diagram modeling may also be used to simulate the behavior of a system for a specified time span. Object-oriented applications include all forms of computation paradigms for block diagrams.

Block diagram modeling can also be used to design algorithms to control the real-world systems being modeled, i.e., a block diagram can be converted to a standalone real-time program and executed on a target system. A modeling diagram can interface with the generated real-time program to exchange run-time data, e.g., change parameters or upload data.

Real-time systems may be thought of has having two main components. A first component is a real-time program required to run a hardware device, such as control logic. A second component is interface code for runtime analysis, visualization and control of the real-time program.

SUMMARY

In general, according to one aspect of the invention, a method includes identifying portions of a model as being either critical to a real-time execution of the model or non-critical to a real-time execution of the model, and generating code that is capable of real-time execution based on the critical portions of the model.

One or more of the following features may also be included. The non-critical portions are post-processing units. Post-processing units are logical units of the model that have no synchronized data outputs that feed non-post-processing sections of the model. Generating further includes establishing an inter-process communication link between the code and the non-critical portions of the model. The method may further include receiving output from the code via the inter-process communications link. The method may also include executing the code on a target processor. The method may also include processing the output in the non-critical portions of the model.

In general, according to another aspect of the invention, a method includes specifying a model, the model including sections, a first subset of the sections designated post-processing unit sections and a second subset of the sections designated as core processing unit sections, and generating software source code for the model with a code generator using the second subset.

One or more of the following features may also be included. The post-processing unit sections are logical units of the model that have no data outputs that feed core processing unit sections. The method may further include linking the code to the first subset of sections through an inter-process communication link, and executing the code on a target processor. Specifying the model includes receiving a user input through a graphical user interface (GUI). Generating includes applying a set of software instructions resident in the code generator to the second subset. The method may further include receiving output from the code via the inter-process communication link and processing the output in the first subset.

In general, in another aspect of the invention, a system includes a graphical user interface (GUI) adapted to receive user inputs to specify components of a model, the components containing a first subset of sections designated as post-processing elements of a model and a second subset of sections designated as core elements of the model.

One or more of the following features may also be included. The system may further include an automatic code generator to generate code capable of real-time execution based on the second subset of the sections. The second subset includes elements representing essential computational components of the model. The system may further include a link to provide inter-process communication between the code and the first subset of sections of the model. The first subset is non-real time post-processing sections. The automatic code generator includes a set of predefined instructions resident in the automatic code generator to generate code corresponding to the second subset. The code is C programming language. The system may further include a compiler for compiling the code for a target processor.

In general, in another aspect the invention features a method including receiving user input through a graphical user interface (GUI) specifying a block diagram model, the block diagram model including sections, a first subset of the sections designated post-processing unit sections and a second subset of the section designated as core processing unit sections, generating software source code for the block diagram model with a code generator using the second subset, linking the software source code to the first subset via an inter-process communication link, and compiling the software source code into executable code.

One or more of the following features may also be included. The method may further include executing the executable code on a target processor.

Embodiments of the invention may have one or more of the following advantages.

Partitioning a model diagram achieves a division of processing load between a target process and a host process. Partitioning based on user-defined properties ensures that no target code is generated for sections of a model diagram that perform run-time post-processing operations. Arbitrary portions of a model diagram can be specified for host-based, post-processing of target signals.

Run-time post processing of target data can be seamlessly specified in a model diagram environment. Sections of the model diagram that perform real-time post-processing are marked as such by a user and subsequently excluded from the real-time program during code generation. Run-time post-processing operations include logging, analysis, data transformations, visualization and non-hard-real-time feedback control of the target system.

A user can specify an arbitrary portion of the model diagram as a post-processing unit (PPU).

User-defined blocks can be specified in a textual language and included in the PPU, allowing coding the post process operation as a mixture of graphical and textual programming. Automatic partitioning of PPUs allows for the seamless transition, with respect to analysis, visualization and run-time target control, between the various stages of a design cycle. The same model diagram is used at all stages of the design cycle, from simulation and rapid prototyping to embedded code. Sections of the model diagram that are stripped from the generated code are completely functional. The fact that the core computations are running in the target and that the host is running the PPUs is transparent to the end user. This enables efficient, production style code to be generated without the loss of run-time analysis, visualization and autonomous tuning of the target.

The ability to run entire sections of the model diagram as host-based PPUs allows the post-processing operations to be programmed all, or in part, in the model diagram language as opposed to textual languages such as the C programming language.

A data object enables a user to fully define the information related to the data to be used with a model-based block diagram.

Other features and advantages of the invention will become apparent from the following description, including the claims and drawings.

DRAWINGS

Like reference symbols in the various drawings indicate like elements.

DESCRIPTION

Figure 1:
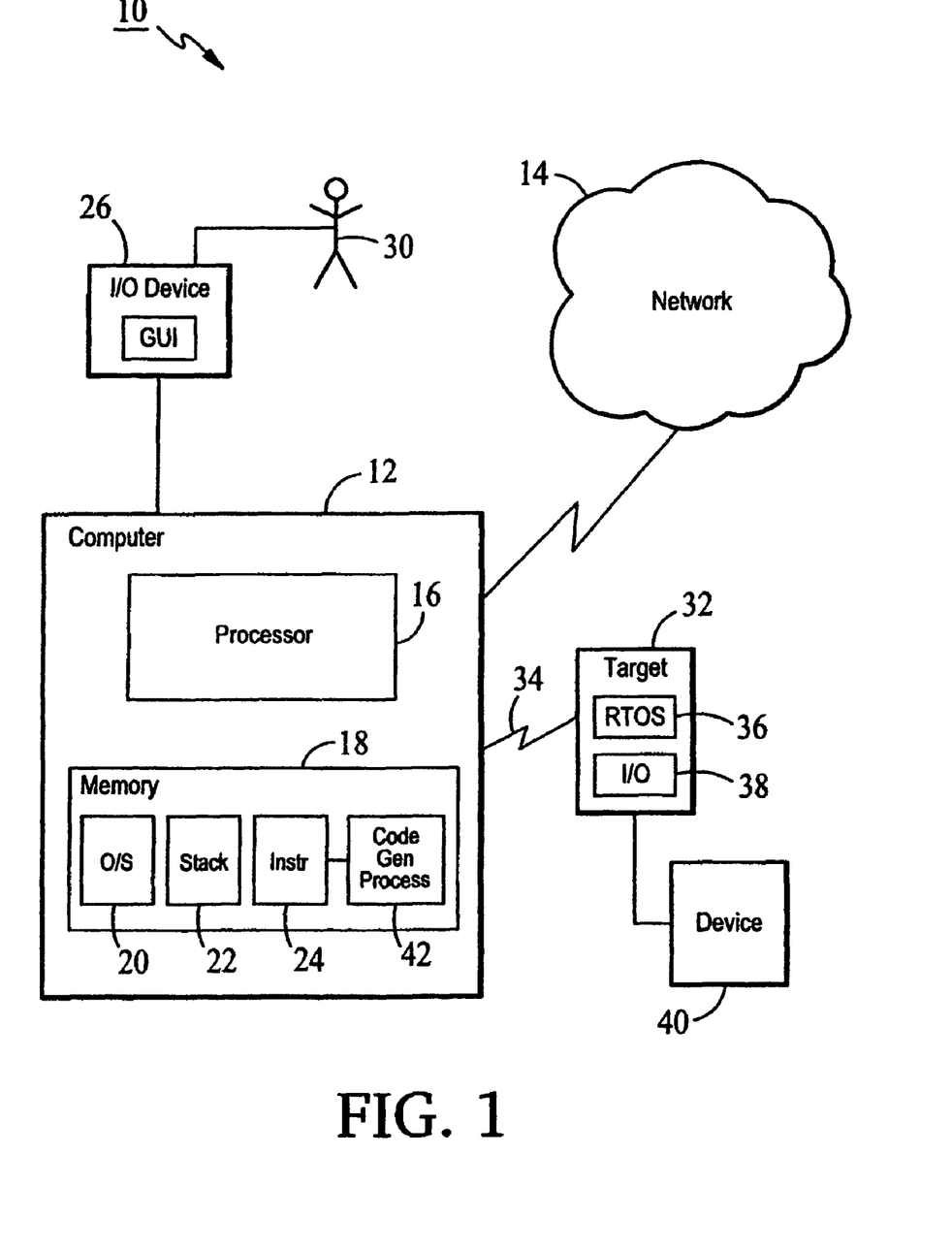
FIG. 1 shows a system.

FIG. 1 shows an exemplary system 10. The system 10 includes a host computer 12, such as a personal computer (PC). Computer 12 may be connected to a network 14, such as the Internet, that runs TCP/IP (Transmission Control Protocol/Internet Protocol) or another protocol. Connections may be via Ethernet, wireless link, or telephone line.

Host computer 12 contains a processor 16 and a memory 18. Memory 18 stores an operating system ("OS") 20 such as Windows98.RTM. or Linux, a TCP/IP protocol stack 22 for communicating over network 14, and machine-executable instructions 24 executed by processor 16 to perform a code generation process 42 below. Host computer 12 also includes an input/output (I/O) device 26 for display of a graphical user interface (GUI) 28 to a user 30.

The host computer 12 communicates with a target computer 32 via a communications link 34. The target computer 32 runs a real-time operating system (RTOS) 36. The target computer 32 can also include an input/output (I/O) port 38 for producing hardware I/O to a hardware device 40 connected to the target computer 32. The target computer 32 can be a separate computer residing within the network 14, or it can be the host computer 12 that performs the function of the target computer 32. the target computer 32 can also be a dedicated computer that is directly attached to the host computer via communication link 34, which can be shared memory or a high speed bus.

The code generation process 42 executes in the host computer 12. The code generation process 42 is a process in which a behavior represented by a modeling diagram executing in computer 12 and being displayed on the GUI 28 is translated into a standalone, real-time software program code, e.g., C code. An example automatic code generator is the Target Language Compiler included in the Real-Time Workshop® that generates code for Simulink® block diagrams and state flow charts from Math Works, Inc. of Natick, Mass., incorporated herein by reference. The real-time code includes only code executing in the target computer 32 that is characterized as critical for control of the hardware device 40 and not code generated for other devices (not shown) that perform off-line operations such as run-time analysis and visualization of control signals; this code would be characterized as non-critical.

Figure 2:
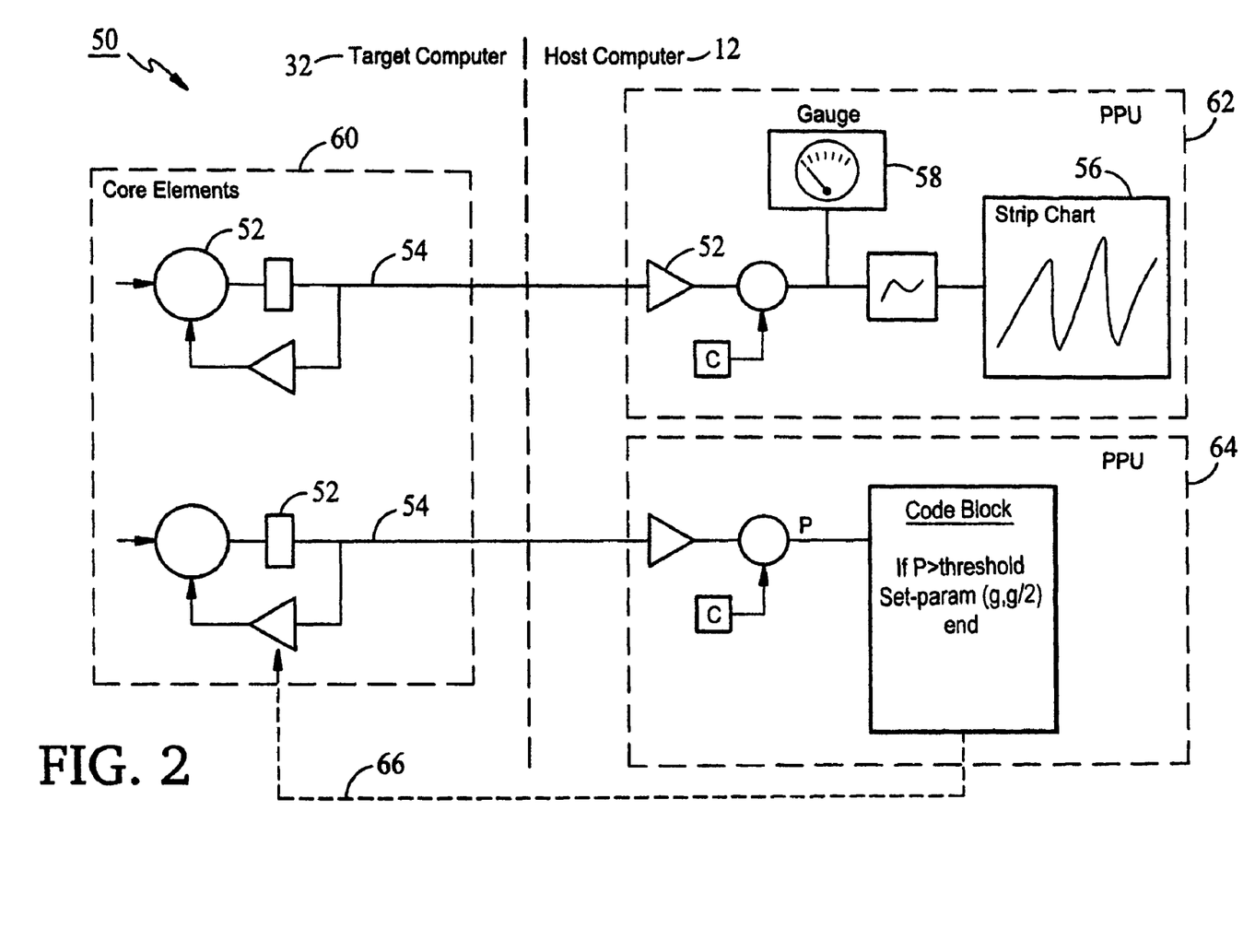
FIG. 2 shows a block diagram model.

Referring to FIG. 2, a block diagram model 50 is a pictorial model of a dynamic system. The block diagram 50 is specified by the user 30 and displayed on the GUI 28. The block diagram model 50 includes of a set of symbols, called blocks 52, interconnected by lines 54. Each of the blocks 52 represents an elementary dynamic system that produces an output either continuously (a continuous block) or at specific points in time (a discrete block). The lines 54 represent connections of block inputs to block outputs.

Every block in the block diagram model 50 is an instance of a specific type of block. The type of block determines the relationship between a block's outputs and its inputs, states, and time. The block diagram model 50 may contain any number of instances of any type of block needed to model a system. The blocks 52 are also characterized as critical real-time components of the block diagram model 50. The block diagram model 50 also includes two analysis/visualization components, i.e., a strip chart 54 and a gauge 56; these components are characterized as non-critical. As is typical in the block diagram model 50, real-time components and analysis/visualization components are intermingled. As will be described below, code generated for the block diagram model 50 and executing on the target computer 32 only includes the critical real-time components, called the core elements, that are crucial to the control of the hardware device 40. No code is generated for devices such as the strip chart 56 and gauge 58 that perform off-line operations such as run-time analysis and visualization of control signals. The process 42 determines which components of the block diagram 50 are core elements and which components are non-essential elements, as is described below.

Certain definitions are useful in the description herein.

Core or critical elements are computational elements of a block diagram, e.g., blocks and signals, that represent essential computations of a real world system. By essential we mean those elements that are critical to the control of the example hardware device 40. For example, controller logic is a core real-time element.

Post processing refers to performing operations on data generated by the target computer 32 and acquired by the host computer 12. For example, signal data retrieved from the target computer 32 may undergo a coordinate transformation and smoothing procedure for the purpose of visual display on the GUI 28. This coordinate transformation and smoothing is not included in code executing in the target computer 32 since it is not a core operation.

Run time refers to the fact that the post processing occurs in parallel with the core processing that is occurring on the target computer 32. Data generated by the target computer 32 is acquired via the communication link 34, allowing interactive analysis of data as well as host-based, autonomous control of the target computer program. Run time also refers to simulating the block diagram model 50 in interpreted mode on the host computer 12., i.e., PPUs are also functional during interpretive host-based simulations.

Post processing unit (PPU) refers to a logical section, or unit, of the block diagram model 50 used for run-time post processing of data. Example run time post processing operations include logging, analysis, data transformation, visualization and non-hard-real-time feedback control of the target process. Runtime post processing is performed by the host computer 12 and not by the target computer 32, thus reducing the computational load of the target computer 32.

The block diagram model 50 includes core elements 60 and two PPUs, i.e., PPU 62 and PPU 64. The block diagram model 50 is simulated by running all the components, core elements 60, PPU 62 and PPU 64, in an interpreted manner on the host computer 12. When a standalone, run-time program is generated for the block diagram model 50, the PPU 62 and PPU 64 are filtered or excluded from the generated software code. Specifically, no software code will execute on the target computer 32 that is non-essential or non-critical. That is, there is no software code generated for the target computer 32 to perform scaling and data smoothing operations, i.e., PPU 62, as well as the monitoring of the 'P' signal and subsequent target feedback, i.e., PPU 64. The operations performed by PPU 62 and PPU 64 are not required for the target computer 32, only for non-synchronized host/target operations such as debugging or monitoring the performance of the target computer 32. Debugging can include providing updated non-synchronized outputs to the code executing on the target computer 32. Using inter-process communication over a communication line 66, PPU 64 acquires data from the core elements 60 of the target computer 32 and run-time post processing in the PPU 64 is performed on the host computer 12. Feedback control performed by PPU 64 is realized by sending parameters or commands to the target computer 32 over the communication line 66. The communication line 66 includes a physical link such as TCP/IP, serial or shared memory, and contains messages having formats that indicate the type of message received.

To interface with the core elements 60, the host computer 12 interfaces with the real-time software code executing on the target computer 32, uploads data at the boundary of the PPU 64 and runs the PPU 64. The host block diagram environment does an inverse partitioning of the block diagram model in the process of interfacing to the executing code on the target computer 32. Instead of partitioning away the PPUs 62 and 64, as for software code generation, the PPUs 62 and 64 are initialized to receive and process the raw data from the target computer 32 while the core elements 60 are removed from the execution space. The portion of the block diagram model 50 representing the core elements 60 does not perform any signal calculations on the host computer 12 when in target interface mode.

A slightly more refined definition of a PPU is that it is a logical unit of a block diagram model, or a logical chain of units, that perform run-time processing of target computer signals. The essential characteristic of a PPU is that it has no synchronized data outputs that feed non-PPU sections of the block diagram model 50, i.e., a PPU may only perform post processing of target computer signals.

Figure 3:
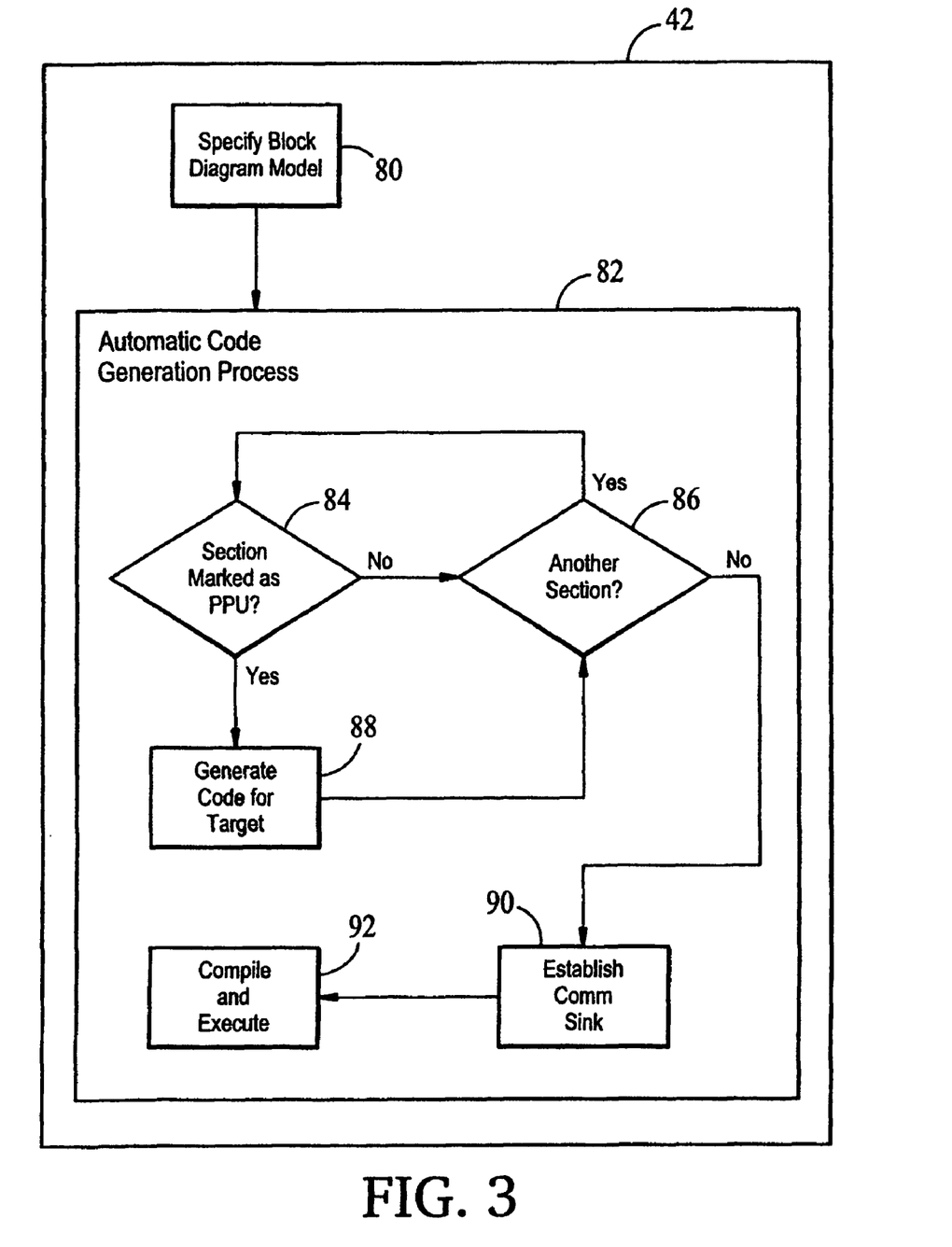
FIG. 3 shows a code generation process.

Referring to FIG. 3, the code generation process 42 includes specifying 80 a model of a dynamic system to be simulated and displayed on a graphical user interface. The model graphically depicts the time-dependent mathematical relationships among the system's inputs, states and outputs. A model-based design environment is an executable specification that can be translated to target ready code, deployable on hardware or software platforms. Platforms include CPUs, real-time operating systems, custom ASICs, and hardware FPGAs. The model includes a set of symbols, called blocks, interconnected by signal lines that carry signals. Blocks are functional entities that operate on signal values contained in the signal lines. Each block can have zero or more input signal lines and zero or more output signal lines. Blocks can have states. A state is a variable that determines a block's output and whose current value is a function of the previous values of the block's states and/or inputs.

Once the block diagram model is specified 80, the process 50 executes an automatic code generation process 82. The automatic code generation process determines 84 whether a section of the block diagram model is a post processing unit (PPU). As described above, a PPU is a logical unit of the block diagram model that has no data outputs that feed non-PPU sections of the block diagram model. If the section is marked as a PPU no code is generated 84. If the section is not marked as a PPU, code is generated 86. A communications link is established 88 between the generated code compiled and executed on the target computer and the PPU sections on the host computer.

Figure 4:
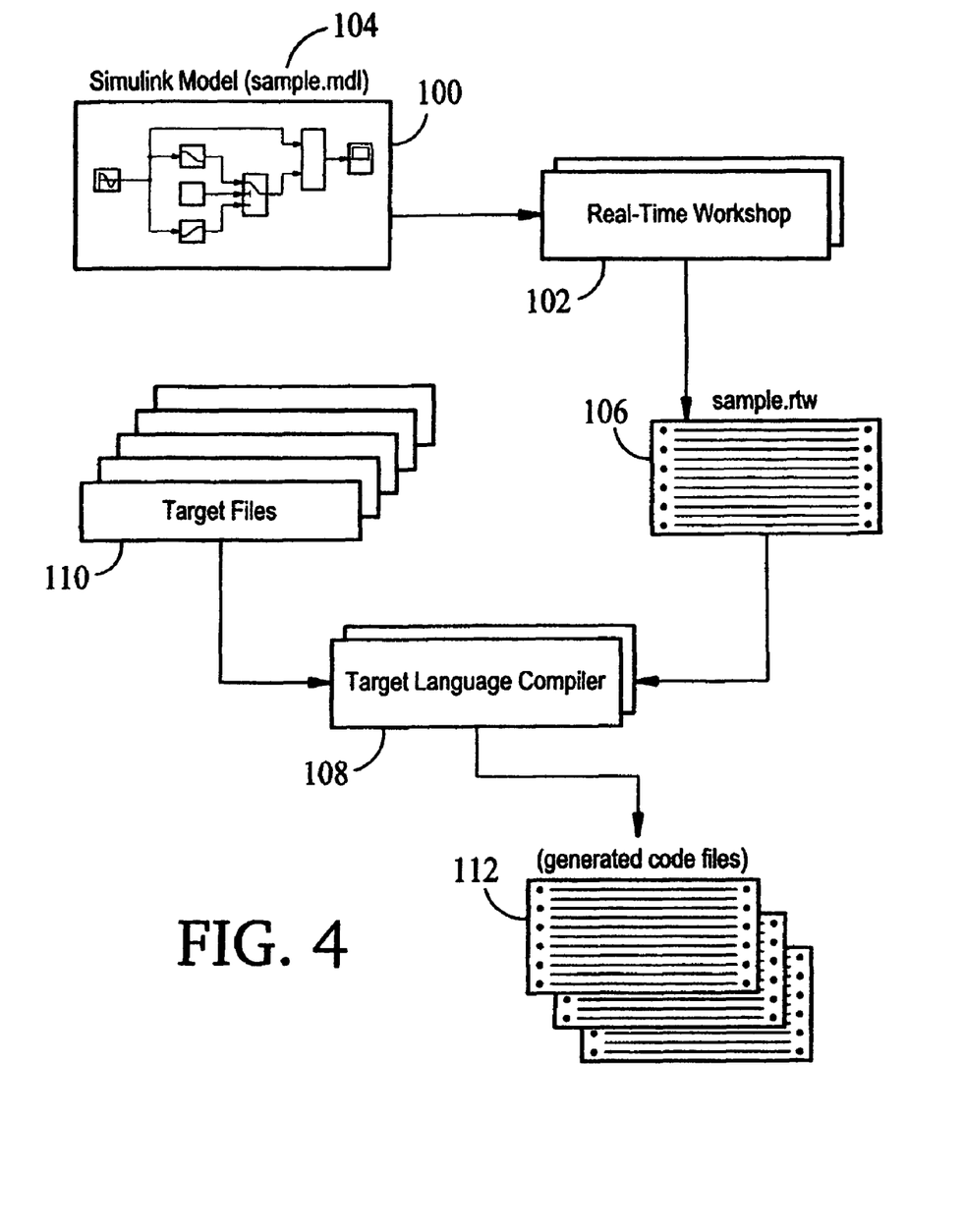
FIG. 4 shows an example of the automatic code generation process.

Referring to FIG. 4, an example of the code generator process 42 can be described in conjunction with Real Time Workshop®. Real Time Workshop® is a set of tools that generate code from Simulink® models for targeting real-time systems. When generating code from a Simulink® model 100 using Real-Time Workshop® 102, a Simulink® file 104, e.g., Sample.rtw, is utilized. Real Time Workshop file 106 includes all of the model-specific information required for generating code from the Simulink® file 104. The Real Time Workshops® file 106 is passed to the target language compiler 108, which uses the Real-Time Workshops® file 106 in combination with a set of included system target files and block target files 110 to generate code 112. System target files are used to specify the overall structure of the generated code 112. Block target files are used to implement the functionality of Simulink® blocks.

Sections of the Real-Time Workshop® file 106 corresponding to PPUs are internally marked as such. The target language compiler 108 ignores these sections and only produces code 112 that includes core elements of the original block diagram model.

Process 42 is not limited to use with the hardware/software configuration of FIG. 1; it may find applicability in any computing or processing environment. Process 42 may be implemented in hardware (e.g., an ASIC {Application-Specific Integrated Circuit} and/or an FPGA {Field Programmable Gate Array}), software, or a combination of hardware and software.

Process 42 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 42.

Process 42 may also be implemented as a computer-readable storage medium, configured with a computer program, where, upon execution, instructions in the computer program cause the computer to operate in accordance with process 42.

Other embodiments are within the scope of the following claims.

I claimed:

1. A computer-readable medium holding executable instructions that when executed on a processor generate computer program instructions, the medium holding instructions for:
   analyzing components in a simulatable block diagram model, the analyzing:
      identifying components that are critical to control of a hardware device, and
      identifying components that are not critical to control of the hardware device;
   marking the components identified as critical to control of the hardware device as critical components;
   marking the components identified as not critical to control of the hardware device as non-critical components; and
   generating the computer program instructions for the simulatable block diagram model with an automatic code generator, the computer program instructions implementing behavior of the block diagram model, the generating including:
      generating computer program instructions for only the components of the block diagram model marked as critical.

2. The computer-readable medium of claim 1, further comprising:
   storing data associated with the components that are not critical to control of the hardware device.

3. The computer-readable medium of claim 1, where the components that are not critical to control of the hardware device are included in a user interface for the hardware device.

4. The computer-readable medium of claim 1, further comprising:
   receiving a user input related to one or more components that are critical to control of the hardware device.

5. The computer-readable medium of claim 4, further comprising:
   receiving a user input related to one or more components that are not critical to control of the hardware device.

6. The computer-readable medium of claim 1, further comprising:
   receiving a user input via a graphical user interface, the user input related to:
      one or more components that are critical to control of the hardware device, or
      one or more components that are not critical to control of the hardware device.

7. The computer-readable medium of claim 1, where the model includes non-critical portions that are post-processing units.

8. The computer-readable medium of claim 7, the post-processing units are logical units of the model that have no synchronized data outputs feeding non-post-processing portions of the model.

9. The computer-readable medium of claim 1, wherein the generating further comprises:
   establishing an inter-process communication link between the generated computer program instructions and non-critical portions of the model.

10. The computer-readable medium of claim 9, further comprising:
    receiving output from the generated computer program instructions via the inter-process communications link.

11. The computer-readable medium of claim 10, further comprising:
    executing the computer program instructions on a target processor associated with a target.

12. The computer-readable medium of claim 10, further comprising:
    processing the output in non-critical portions of the model.

13. A computer-readable medium holding executable instructions that when executed on a processor generate computer program instructions, the medium holding instructions for:
    displaying a graphical user interface, the graphical user interface for:
       displaying components in a simulatable block diagram model,
       receiving a first user input related to a component that is critical to control of a hardware device, or
       receiving a second user input related to a component that is not critical to control of a hardware device;
    marking components identified as critical to control of the hardware device as critical components; and
    generating computer program instructions for the simulatable block diagram model via an automatic code generator, where the computer program instructions implement behavior of the block diagram model on the hardware device when the hardware device executes the generated computer program instructions, the generating including:
       generating computer program instructions for the components of the block diagram model that are marked as critical, and
       maintaining an interface to components that are not critical to the control of the hardware device.

14. The computer-readable medium of claim 13, further comprising:
    not generating computer program instructions for components that are not critical to control of the hardware device.

15. The computer-readable medium of claim 13, further comprising:
    marking components identified as non-critical to control of the hardware device as non-critical components.

16. The computer-readable medium of claim 13, further comprising:
    allocating memory for components that are not critical to control of the hardware device.

17. The computer-readable medium of claim 13, further comprising:
    sending the generated computer program instructions to a target device.

18. A computer-implemented method, comprising:
    displaying a graphical user interface, the graphical user interface for:

displaying components in a simulatable block diagram model, the components being:
  critical components that are critical to control of a hardware device, or
  non-critical components that are not critical to control of the hardware device
receiving a first user input related to a critical component, and
receiving a second user input related to a non-critical component;
marking components identified as critical to control of the hardware device as critical components;
marking components identified as non-critical to control of the hardware device as non-critical components; and
generating computer program instructions for the simulatable block diagram model via an automatic code generator, where the computer program instructions implement behavior of the block diagram model on the hardware device, the generating including:
  generating computer program instructions for critical components, and
  not generating computer program instructions for non-critical components.

* * * * *